United States Patent Office 3,325,487
Patented June 13, 1967

3,325,487
2-POLYHALOMETHYL-1,3,5-OXADIAZINE COMPOUNDS
Bernard Loev, Broomall, Pa., assignor to Smith Kline & French Laboratories, Philadelphia, Pa., a corporation of Pennsylvania
No Drawing. Continuation of application Ser. No. 281,042, May 16, 1963. This application Oct. 13, 1964, Ser. No. 403,638
2 Claims. (Cl. 260—244)

This application is a continuing application of Ser. No. 281,042, filed May 16, 1963, now abandoned.

This invention relates to novel 2-polyhalomethyl-1,3,5-oxadiazine compounds having antimicrobial activity. More specifically the compounds of this invention have antimicrobial activity against such organisms as *Salmonella typhimurium*, *Aerobacter aerogenes*, *Klebsiella pneumoniae* and *Escherichia coli* and species of Pseudomonas and Proteus.

The 2-polyhalomethyl-1,3,5-oxadiazine compounds of this invention are represented by the following formula:

Formula I

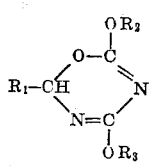

when:

$R_1$ is trifluoromethyl, trichloromethyl, tribromomethyl, difluoromethyl, dichloromethyl or dibromomethyl and $R_2$ and $R_3$ are hydrogen or lower alkanoyl.

the term "lower alkanoyl" where used herein denotes groups having 2 to 6, preferably 2 to 3, carbon atoms.

The compounds of Formula I in which $R_2$ and $R_3$ are hydrogen may be present in any of the following tautomeric forms and it is intended that the specification and claims of this invention include all of the following forms:

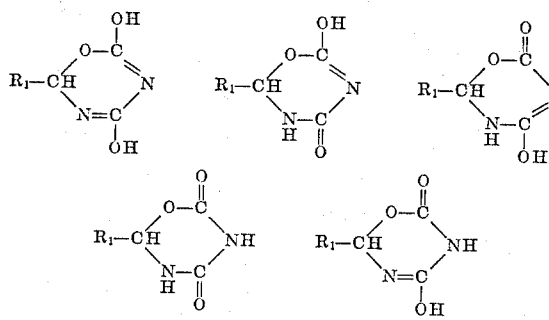

The term $R_1$ is as defined above.

The compounds of this invention are prepared by the following procedure:

Formula II

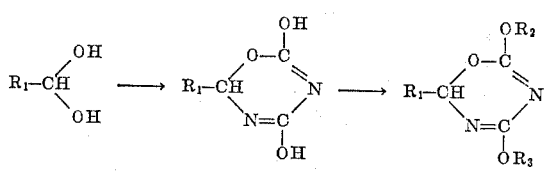

The terms $R_1$, $R_2$ and $R_3$ are as defined above. According to this procedure, a 2-polyhalo-acetaldehyde hydrate is treated with an excess of sodium cyanate and an excess of trifluoroacetic acid in an inert solvent such as an ether, for example diethyl ether or preferably tetrahydrofuran; a hydrocarbon such as benzene or toluene or a halogenated hydrocarbon such as methylene chloride or dichloromethane. The reaction is carried out at about 15–50° C. conveniently at room temperature for about 2–24 hours preferably about 2–4 hours. The reaction mixture is filtered, evaporated and the residue is recrystallized to give the 1,3,5-oxadiazine product.

The mono- and di-lower alkanoyl derivatives of this invention are prepared by reacting the compounds of Formula II with one or two molar equivalents, respectively, of a lower alkanoic acid anhydride or a lower alkanoyl halide. When one mole of the lower alkanoic acid anhydride or lower alkanoyl halide is used, a mixture of alkanoyl derivatives is obtained which may be separated by fractional crystallization.

The following examples are not limiting but are illustrative of the compounds of this invention.

*Example 1*

To a solution of 16.6 g. of chloral hydrate in 250 ml. of tetrahydrofuran is added 26.0 g. of sodium cyanate. The mixture is chilled and 29.7 ml. of trifluoroacetic acid is added. The mixture is stirred for two hours at room temperature and filtered. The filtrate is evaporated at 25° C. in vacuo, leaving an oil. The oil solidifies on stirring with water; the solid is collected and dried in a desiccator. It is recrystallized twice from acetone-water to give 2-trichloromethyl - 4,6 - dihydroxy - 1,3,5-oxadiazine, M.P. 240° C. (with decomposition).

*Example 2*

Sodium cyanate (13.0 g.) is added to a solution of 5.8 g. of fluoral hydrate in 150 ml. of tetrahydrofuran, the mixture is cooled and treated with 14.8 ml. of trifluoroacetic acid. After stirring for two hours at room temperature, filtering, concentrating the filtrate and recrystallizing the residue as in Example 1, 2-trifluoromethyl - 4,6 - dihydroxy - 1,3,5-oxadiazine is obtained.

Similarly using 15.0 g. of bromal hydrate in place of 2,2,2 - trifluoroethylene - 1,1 - glycol in the above procedure the product is 2 - tribromomethyl - 4,6 - dihydroxy-1,3,5-oxadiazine.

*Example 3*

A solution of 3.3 g. of 2,2-dichloroacetaldehyde hydrate in 100 ml. of ethyl ether is treated with 6.5 g. of sodium cyanate. The resulting mixture is cooled and treated with 7.7 ml. of trifluoroacetic acid. The mixture is then stirred at room temperature for three hours and filtered. The filtrate is evaporated in vacuo and the residue is recrystallized from tetrahydrofuran and petroleum ether to give 2 - dichloromethyl - 4,6 - dihydroxy-1,3,5-oxadiazine.

Similarly using 5.5 g. of 2,2-dibromoacetaldehyde hydrate as the starting material in the above reaction, the product is 2 - dibromomethyl - 4,6 - dihydroxy - 1,3,5-oxadiazine.

*Example 4*

Five grams of 2 - trichloromethyl - 4,6-dihydroxy-1,3,5-oxadiazine prepared as in Example 1 and 25 ml. of acetyl anhydride are heated at reflux for two hours. The resulting mixture is concentrated in vacuo and the residue is recrystallized from aqueous acetone to give 4,6 - diacetoxy - 2 - trichloromethyl - 1,3,5-oxadiazine.

*Example 5*

A mixture of 1.8 g. of 2 - trifluoromethyl - 4,6 - dihydroxy-1,3,5-oxadiazine prepared as in Example 2 and 1.3 g. of propionic anhydride in chloroform is heated at reflux for two hours to give, after evaporating and then recrystallizing the residue, 2 - trifluoromethyl - 6-hydroxy - 4 - propionyloxy - 1,3,5 - oxadiazine and 2-trifluoromethyl - 4 - hydroxy - 6 - propionyloxy - 1,3,5-oxadiazine.

What is claimed is:

1. A compound having the formula:

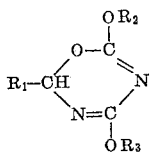

in which:

$R_1$ is a member selected from the group consisting of trifluoromethyl, trichloromethyl, tribromomethyl, difluoromethyl, dichloromethyl and dibromomethyl and $R_2$ and $R_3$ are members selected from the group consisting of hydrogen and lower alkanoyl.

2. A compound having the formula:

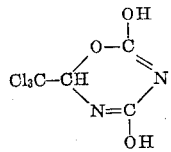

No references cited.

WALTER A. MODANCE, Primary Examiner.

R. T. BOND, Assistant Examiner.